US012561245B2

(12) United States Patent     (10) Patent No.:   US 12,561,245 B2

Jeong et al.     (45) Date of Patent:    Feb. 24, 2026

(54) STORAGE DEVICE CAPABLE OF PERFORMING PEER-TO-PEER DATA TRANSFER AND OPERATING METHOD THEREOF

(71) Applicant: Samsung Electronics Co., Ltd., Suwon-si (KR)

(72) Inventors: Wonseb Jeong, Suwon-si (KR); Hyunsub Song, Suwon-si (KR); Hyeonho Song, Suwon-si (KR); Donghun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/903,073

(22) Filed: Oct. 1, 2024

(65) Prior Publication Data

US 2025/0238371 A1     Jul. 24, 2025

(30) Foreign Application Priority Data

Jan. 24, 2024    (KR) ........................ 10-2024-0011179

(51) Int. Cl.
| | | |
|---|---|---|
| *G06F 12/08* | (2016.01) | |
| *G06F 3/06* | (2006.01) | |
| *G06F 12/0802* | (2016.01) | |

(52) U.S. Cl.
CPC ........ *G06F 12/0802* (2013.01); *G06F 3/0604* (2013.01); *G06F 3/0656* (2013.01); *G06F 3/0679* (2013.01); *G06F 2212/60* (2013.01)

(58) Field of Classification Search
CPC .. G06F 12/0802; G06F 3/0604; G06F 3/0656; G06F 2212/60

(Continued)

(56) References Cited

U.S. PATENT DOCUMENTS

| | | | |
|---|---|---|---|
| 11,822,813 | B2 | 11/2023 | Jeong et al. |
| 2020/0226070 | A1 | 7/2020 | Byun |

(Continued)

FOREIGN PATENT DOCUMENTS

| | | |
|---|---|---|
| CN | 116450303 A | 7/2023 |
| KR | 20220090853 A | 6/2022 |

(Continued)

OTHER PUBLICATIONS

Extended European Search Report for European Application No. 24223769.1, dated Jun. 16, 2025.

(Continued)

*Primary Examiner* — Than Nguyen

(74) *Attorney, Agent, or Firm* — Wolf, Greenfield & Sacks, P.C.

(57) ABSTRACT

A storage device includes a non-volatile memory and a storage controller, wherein the storage controller includes a cache memory storing some of data stored in the non-volatile memory, an interface circuit receiving, from a first external host, a first request including a source address related to the external storage device, a destination address related to the storage device, and cache update information indicating an update method of the cache memory, provide a second request including the source address to the external storage device, and receive, from the external storage device in response to the second request, a response including first data corresponding to the source address, an address translation circuit generating a physical address of a first type based on the destination address, and a cache controller updating a cache area indicated by the physical address of the first type based on the cache update information.

20 Claims, 11 Drawing Sheets

(58) Field of Classification Search
    USPC ......................................................... 711/118
    See application file for complete search history.

(56)                        References Cited

U.S. PATENT DOCUMENTS

| | | | | |
|---|---|---|---|---|
| 2021/0064293 A1* | 3/2021 | Cho | ...................... | G06F 3/0673 |
| 2021/0232343 A1* | 7/2021 | Kim | .................... | G06F 11/1068 |
| 2021/0318980 A1 | 10/2021 | Pal et al. | | |
| 2022/0269433 A1 | 8/2022 | Pal et al. | | |
| 2022/0350755 A1* | 11/2022 | Hahn | .................. | G06F 13/1642 |
| 2023/0161721 A1 | 5/2023 | Cannata et al. | | |
| 2023/0205449 A1* | 6/2023 | Jeong | .................. | G06F 12/0246 |
| | | | | 711/118 |
| 2023/0208439 A1 | 6/2023 | Hong | | |

FOREIGN PATENT DOCUMENTS

| | | |
|---|---|---|
| KR | 20230080282 A | 6/2023 |
| KR | 20230101405 A | 7/2023 |

OTHER PUBLICATIONS

Sharma et al., An Introduction to the Compute Express Link (CXL) Interconnect. Arxiv.org, Jun. 20, 2023;XP091749416 (1-35).

* cited by examiner

STORAGE DEVICE CAPABLE OF PERFORMING PEER-TO-PEER DATA TRANSFER AND OPERATING METHOD THEREOF

CROSS-REFERENCE TO RELATED APPLICATIONS

This application is based on and claims priority under 35 U.S.C. § 119 to Korean Patent Application No. 10-2024-0011179, filed on Jan. 24, 2024, in the Korean Intellectual Property Office, the disclosure of which is incorporated by reference herein in its entirety.

BACKGROUND OF THE INVENTION

The inventive concept relates to memory, and more particularly, to a storage device and an operating method of the storage device.

Semiconductor memories are classified into volatile memory devices, such as static random-access memory (SRAM) and dynamic RAM (DRAM), which do not retain stored data when the power supply is cut off, and non-volatile memory devices, such as flash memory, phase-change RAM (PRAM), magnetic RAM (MRAM), resistive RAM (RRAM), and ferroelectric RAM (FRAM), which retain stored data even when the power supply is cut off.

A plurality of hosts may access storage devices included in a shared memory pool. When a host intervenes to transmit data between storage devices, the overhead of data transmission may increase, and thus, the storage devices may be required to transmit/receive data in a peer-to-peer (P2P) manner without any host intervention.

SUMMARY OF THE INVENTION

The inventive concept provides a storage device capable of maintaining cache coherence during peer-to-peer (P2P) data transfer between storage devices by mapping logical addresses to device physical addresses, and an operating method of the storage device.

According to an aspect of the inventive concept, there is provided a storage device including a non-volatile memory and a storage controller, wherein the storage controller includes a cache memory configured to store some of data stored in the non-volatile memory, an interface circuit configured to receive, from a first external host from among a plurality of external hosts, a first request including a source address related to the external storage device, a destination address related to the storage device, and cache update information indicating an update method of the cache memory, provide a second request including the source address to the external storage device, and receive, from the external storage device in response to the second request, a response including first data corresponding to the source address, buffer memory configured to temporarily store the first data received from the external storage device, an address translation circuit configured to generate a physical address of a first type based on the destination address, and a cache controller configured to update a cache area indicated by the physical address of the first type based on the cache update information.

According to another aspect of the inventive concept, there is provided an operating method of a storage device, the operating method including receiving, from an external host, a first request including a source address indicating a storage area of a non-volatile memory, a destination address indicating a storage area of the external storage device, and cache update information indicating an update method of a cache memory, generating a physical address of a first type indicating a cache area of the cache memory based on the source address, generating a physical address of a second type indicating the storage area of the non-volatile memory based on the source address, acquiring data based on the physical address of the first type and the physical address of the second type, updating a cache area indicated by the physical address of the first type based on the cache update information, providing a second request including the destination address and the data to the external storage device, and receiving a response corresponding to the second request from the external storage device.

According to another aspect of the inventive concept, there is provided an operating method of operating a storage device, the operating method including receiving, from an external host, a first request including a source address indicating one of a storage area of the external storage device or a storage area of the non-volatile memory, a destination address indicating a remaining one of the storage area of the external storage device or the storage area of the non-volatile memory, and cache update information indicating an update method of a cache memory, providing a second request including one of the source address or the destination address to the external storage device, generating a physical address of a first type indicating a cache area of the cache memory based on a remaining one of the source address or the destination address, updating a cache area indicated by the physical address of the first type based on the cache update information, and receiving a response corresponding to the second request from the external storage device.

BRIEF DESCRIPTION OF THE DRAWINGS

Embodiments will be more clearly understood from the following detailed description taken in conjunction with the accompanying drawings in which:

FIG. 1 is a block diagram of a storage system according to an embodiment;

FIG. 3 is a diagram illustrating a computing system according to an example embodiment;

FIG. 9 is a diagram illustrating a computing system according to an example embodiment;

FIG. 10 is a diagram illustrating a computing system according to an example embodiment.

DETAILED DESCRIPTION

Figure 2:
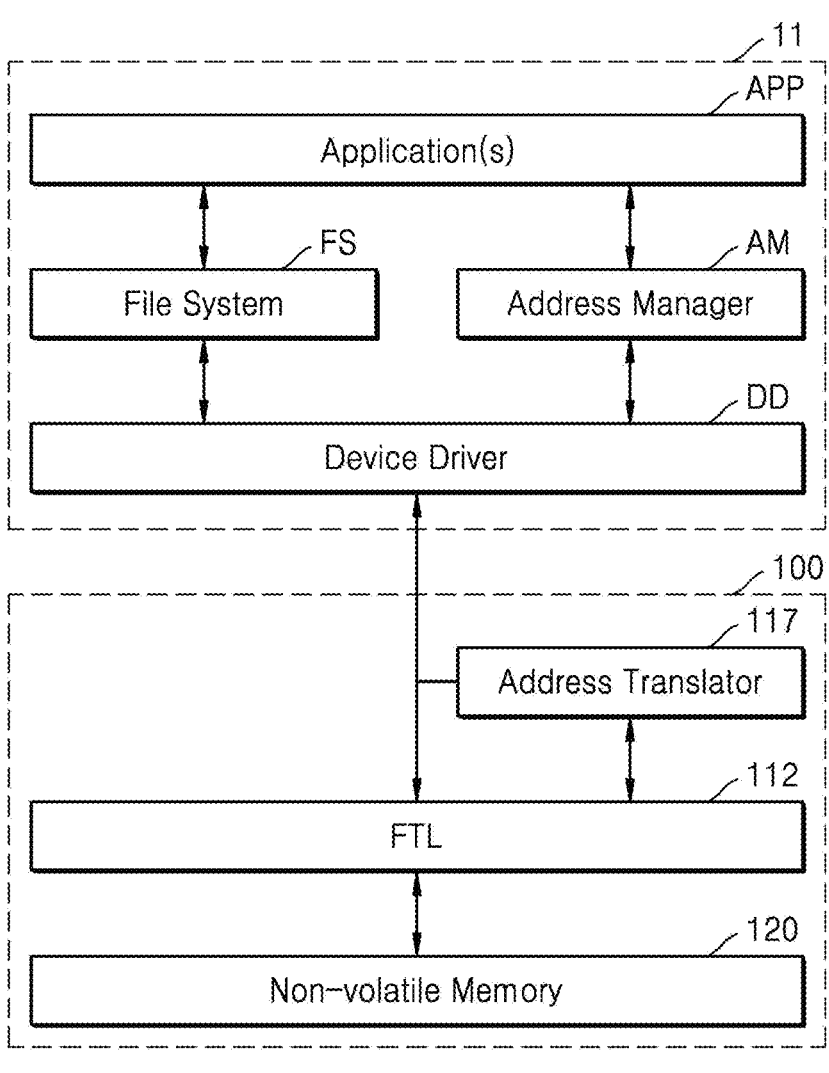
FIG. 2 is a diagram illustrating a software layer of the storage system of FIG. 1.

Hereinafter, embodiments of the inventive concept will be described in detail with reference to the attached drawings.

Figure 1:
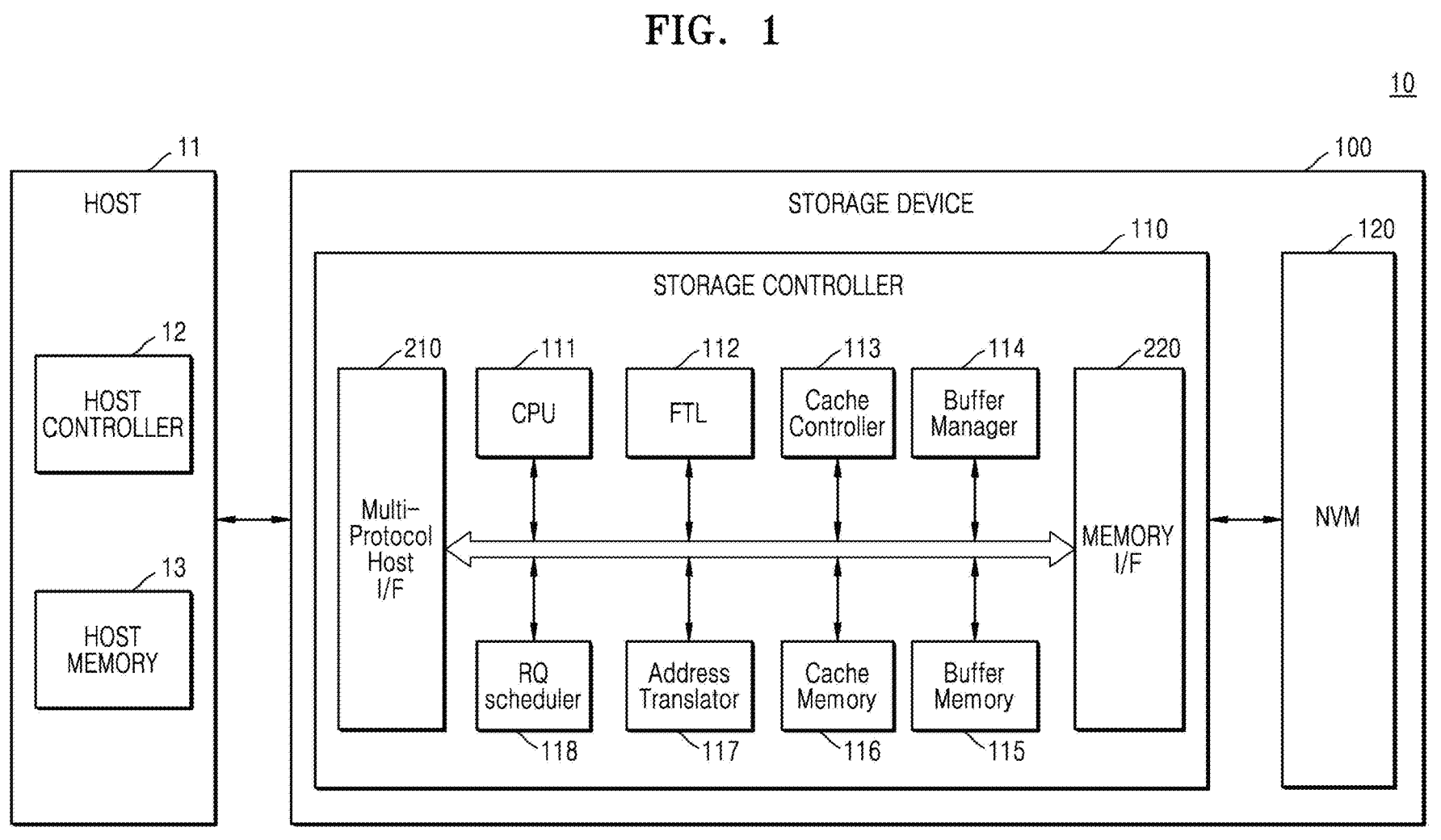

FIG. 1 is a block diagram of a storage system 10 according to an embodiment. Referring to FIG. 1, the storage system 10 may include a host 11 and a storage device 100. In an embodiment, the storage system 10 may be an information processing device configured to process various pieces of information and store the processed information, such as a personal computer (PC), a laptop, a server, a workstation, a smartphone, a tablet PC, a digital camera, and a black box.

The host 11 may control all operations of the storage system 10. For example, the host 11 may transmit a request (or command) to the storage device 100 to store data in the storage device 100 or read data stored in the storage device 100. In an embodiment, the host 11 may be a processor core, such as a central processing unit (CPU) or an application processor (AP) configured to control the storage system 10, or a computing node connected through a network.

In an embodiment, the host 11 may include a host controller 12 and host memory 13. The host controller 12 may be a device configured to control all operations of the host 11 or to control the storage device 100 from the host 11. The host memory 13 may be a buffer memory, cache memory, or operating memory used in the host 11.

The host 11 may transmit a peer-to-peer (P2P) data transmission trigger request to the storage device 100. The storage device 100 may provide data to another storage device or receive data from another storage device in response to the P2P data transmission trigger request. A packet format corresponding to the P2P data transmission trigger request may be a CXL.io packet.

The P2P data transmission trigger request may include a source address indicating a storage area of one of the storage device 100 (e.g., a storage area of a non-volatile memory device 120 therein) or another storage device, a destination address indicating a storage area of the remaining one of the storage device 100 or the other storage device, and data size information. In response to the P2P data transmission trigger request, data included in the storage area indicated by the source address may be transmitted to the storage area indicated by the destination address.

The P2P data transmission trigger request may be a block-based request used for block-based access. That is, the source address or the destination address may be a logical block address (or a logical address). The block-based request may indicate, by using a logical block address, the location to which data will be written or from which data will be read. When the source address or the destination address is a logical block address, the P2P data transmission trigger request may include data size information in block units. The data size information may indicate the size of transmitted data. For example, in a P2P read request, the data size information may indicate the size of read data transmitted from another storage device to the storage device 100, and in a P2P write request, the data size information may indicate the size of write data transmitted from the storage device 100 to another storage device. When the source address or the destination address is a logical block address, the unit of transmitted data may be a logical block size (e.g., 512 bytes) or a page size (e.g., 4 kilobytes). However, the scope of the present disclosure is not limited thereto.

The P2P data transmission trigger request may be a memory-based request used for memory-based access. That is, the source address or the destination address may be a host physical address (or a physical address). The memory-based requests may indicate, by using the host physical address, the location to which data will be written or from which data will be read. When the source address or the destination address is a host physical address, the P2P data transmission trigger request may include data size information in units (e.g., byte units or cache line units) smaller than block units (or page units). A cache line unit may be 64 bytes. The data size information may indicate the size of transmitted data. For example, in a P2P read request, the data size information may indicate the size of read data transmitted from another storage device to the storage device 100, and in a P2P write request, the data size information may indicate the size of write data transmitted from the storage device 100 to the other storage device. When the source address or the destination address is a host physical address, the unit of transmitted data may be byte or cache line size. However, the scope of the present disclosure is not limited thereto.

The P2P data transmission trigger request may include cache update information. The cache update information may indicate an update method for the cache memory 116 in the storage device 100 and a cache memory in another storage device. For example, the cache update information may indicate one of a partial update operation, a full update operation, or an invalidation operation. The partial update operation may be an operation that performs an update by storing some (but not all) of the data corresponding to a P2P data transmission trigger request in cache lines in the cache memory 116. The full update operation may be an operation that performs an update by storing all data corresponding to a P2P data transmission trigger request in the cache lines in the cache memory 116. The invalidation operation may be an operation of invalidating a cache line storing data corresponding to a P2P data transmission trigger request.

In the present specification, the P2P data transmission trigger request may be referred to as a request.

Although the storage system 10 is shown in FIG. 1 as including one host, the storage system 10 may include a plurality of hosts. Each of the plurality of hosts may be configured to access the storage device 100.

For example, each of the plurality of hosts may be a computing node configured to operate independently from each other. The plurality of hosts may be single-core or multi-core processors included in different computing nodes (or computing systems). Alternatively, at least some of the plurality of hosts may be different processors included in the same computing node (or computing system). Alternatively, the plurality of hosts may be processes/processors configured to process different applications.

In an embodiment, the storage system 10 may further include an accelerator (not shown). The accelerator may perform various types of arithmetic operations, calculations, etc. on data on behalf of the host. The accelerator may be configured to access storage device 100. For example, the accelerator may send a request to storage device 100.

The storage device 100 may operate under the control of the host 11. The storage device 100 may include a storage controller 110 and a non-volatile memory device 120. The storage controller 110 may store data in the non-volatile memory device 120 or read data stored in the non-volatile memory device 120 under the control of the host 11. In an embodiment, the storage controller 110 may perform various management operations to efficiently use the non-volatile memory device 120.

The storage device 100 may manage a host physical address-to-device physical address (H2D) map and a logical address-to-device physical address (L2D) map. The H2D map may include mapping information between a host physical address and a device physical address. The L2D map may include mapping information between a logical address and a device physical address. The H2D map and the L2D map may be stored in an address translator 117, a buffer memory 115, or a non-volatile memory 120. The storage device 100 may manage a logical address-to-physical page address (L2P) map. The L2P map may include mapping information between a logical address and a physical page address. The L2P map may be stored in the buffer memory 115.

The host physical address may indicate the actual physical address of a hardware memory device managed by the host 11. The host 11 may recognize or manage a storage space of at least one memory device (e.g., a cache memory (not shown), the host memory 13, or the storage device 100) as a host physical address. That is, the host physical address may be used to access the storage space of at least one memory device in byte units or cache line units. Although the storage system 10 is shown in FIG. 1 as including one storage device, the storage system 10 may include a plurality of storage devices. The host 11 may be configured to access a plurality of storage devices. The host 11 may manage individual host physical address spaces for each of the plurality of storage devices.

The logical address may indicate a logical block address managed by the host 11. The file system layer (FS) of the host 11 may recognize or manage the storage space of the storage device 100 as a logical address. That is, the logical address may be used to access the storage space of the storage device 100 on a block basis or a page basis.

The device physical address may indicate the actual physical address of the storage space in the storage device 100, which is managed by the storage device 100. The device physical address may indicate the actual physical addresses of the non-volatile memory 120, buffer memory 115, and cache memory 116. The device physical address may be used to access the storage space of the storage device 100 in byte units or cache line units.

The physical page address may indicate the actual physical address of the non-volatile memory device 120 managed by the storage controller 110. The storage controller 110 may recognize or manage the storage space of the non-volatile memory device 120 as a physical page address. That is, the physical page address may be used to access the storage space of the non-volatile memory device 120 on a page basis.

In an embodiment, the host 11 may access the storage space of the storage device 100 by using a logical address or a host physical address. For example, the storage space of the storage device 100 may be exposed to the host 11 as a memory mapped area. Alternatively, the storage space of the storage device 100 may be exposed to the host 11 as an area where block-based access is permitted.

The storage controller 110 may include a central processing unit (CPU) 111, a flash translation layer (FTL) 112, a cache controller 113, a buffer manager 114, a buffer memory 115, a cache memory 116, an address translator 117, a request scheduler 118, a multi-protocol host interface circuit 210, and a memory interface circuit 220.

The CPU 111 can control all operations of the storage controller 110. The FTL 112 may perform various operations to efficiently use the non-volatile memory device 120. For example, FTL 112 may be configured to manage address mapping between a logical address from the host 11 and a physical page address of the storage device 100. That is, the FTL 112 may manage an L2P map. For example, the FTL 112 may convert a logical address into a physical page address by referring to the L2P map. The FTL 112 may receive a logical address converted based on a host physical address with reference to the H2D map and the L2D map and may convert the logical address into a physical page address.

The FTL 112 may perform a wear leveling operation to prevent excessive deterioration of a certain memory block among memory blocks (floating blocks) of the non-volatile memory device 120. The lifespan of the non-volatile memory device 120 may be improved by the wear leveling operation of the FTL 112. The FTL 112 may perform garbage collection on the non-volatile memory device 120 to secure a free memory block.

In an embodiment, the FTL 112 may be implemented in a software or hardware form. When the FTL 112 is implemented in a software form, program code or information related to the FTL 112 may be stored in the buffer memory 115 and executed by the CPU 111. When the FTL 112 is implemented in a hardware form, a hardware accelerator configured to perform the operation of the FTL 112 may be provided separately from the CPU 111.

The cache controller 113 may control access operations and update operations for the cache memory 116. The cache controller 113 may access the cache memory 116 based on a device physical address. The cache controller 113 may receive cache update information from the host 11 and perform an update operation on the cache memory 116 based on the cache update information. After performing an update operation on the cache memory 116, the cache controller 113 may provide back-invalidate (BI) information to the host 11. In some embodiments, the cache controller 113 may provide the BI information to host 11 before performing an update operation on the cache memory 116. The host 11 may maintain cache coherence with the cache memory 116 based on the BI information.

The cache controller 113 may check whether data for a given device physical address is cached in the cache memory 116. When data for the device physical address is cached in the cache memory 116 (cache hit), data stored in a cache line indicated by the device physical address may be immediately available. When data for the device physical address is not cached in the cache memory 116 (cache miss), corresponding data may be cached from the non-volatile memory 120 to the cache memory 116 by various cache update methods.

In an embodiment, the cache controller 113 may support cache coherence. For example, the storage system 10 may provide cache coherence by using the Compute eXpress Link (CXL)™ protocol (e.g., CXL.cache). The storage system 10 may provide cache coherence through a snoop request (or BI information) and response.

The cache memory 116 may include a plurality of cache lines (or cache areas). The cache memory 116 may store some (e.g., some but not all) of the data stored in the non-volatile memory 120 in a plurality of cache lines. For example, the cache memory 116 may include a plurality of cache lines including tags and data. For example, the tag may store information about the device physical address.

The buffer manager 114 may manage the buffer memory 115. During a P2P transmission operation between the storage device 100 and an external storage device, the buffer manager 114 may control the buffer memory 115 to temporarily store data to be provided to the external storage device or data provided from the external storage device.

The buffer memory 115 may be a write buffer or a read buffer configured to temporarily store data input to the storage controller 110 or to temporarily store data to be output from the storage controller 110. Alternatively, the buffer memory 115 may be configured to store various information necessary for the storage controller 110 to operate. For example, the buffer memory 115 may store an L2P map managed by the FTL 112. Alternatively, the buffer memory 115 may store software, firmware, or information related to the FTL 112. Alternatively, the buffer memory 115 may store an H2D map and an L2D map that are managed by the address translator 117.

In an embodiment, the buffer memory 115 may be static random access memory (SRAM), but the scope of the present disclosure is not limited thereto and the buffer memory 115 may be implemented with various types of memory devices, such as dynamic random access memory (DRAM), magnetic random access memory (MRAM), and phase-change random access memory (PRAM). For brevity of drawings and convenience of description, the buffer memory 115 is shown in FIG. 1 as being included in the storage controller 110, but the scope of the present disclosure is not limited thereto. The buffer memory 115 may be located outside the storage controller 110, and the storage controller 110 may communicate with the buffer memory 115 through the buffer manager 114.

The address translator 117 may convert the logical address into a device physical address by referring to the L2D map. The address translator 117 may convert the host physical address into a device physical address by referring to the H2D map. The cache controller 113 may access the cache memory 116 based on the device physical address. The address translator 117 may convert the device physical address into a logical address by referring to the L2D map. The FTL 112 may convert the logical address into a physical page address by referring to the L2P map.

The request scheduler 118 may be configured to schedule requests received from a plurality of hosts including the host 11, requests received from a plurality of external storage devices, or requests received from an external accelerator.

In an embodiment, the request scheduler 118 may schedule requests based on cache update information, internal operation information of the non-volatile memory 120, and contention information of the cache memory 116.

Specifically, when the cache update information included in the P2P data transmission trigger request indicates an invalidation operation, the request scheduler 118 may determine that the importance of data corresponding to the P2P data transmission trigger request is of the lowest importance, and may order requests so that a first number of other requests are processed before subsequent operations corresponding to the P2P data transmission trigger request. When the cache update information included in the P2P data transmission trigger request indicates a partial update operation, the request scheduler 118 may determine that the importance of the data corresponding to the P2P data transmission trigger request is general, and may order requests so that a second number of other requests are processed before subsequent operations corresponding to the P2P data transmission trigger request. The second number may be less than the first number. When the cache update information included in the P2P data transmission trigger request indicates a full update operation, the request scheduler 118 may determine that the importance of the data corresponding to the P2P data transmission trigger request is relatively high, and may order requests so that a third number of other requests are processed before subsequent operations corresponding to the P2P data transmission trigger request. The third number may be less than the second number. For example, the third number may be 0.

The request scheduler 118 may schedule requests based on whether internal operations, such as garbage collection or wear leveling, are performed within the non-volatile memory 120.

The request scheduler 118 may schedule requests based on cache contention information indicating the extent to which cache lines in the cache memory 116 are replaced.

The multi-protocol host interface circuit 210 may be configured to communicate with the host 11 according to a predetermined interface protocol. In an embodiment, the predetermined interface protocol may include at least one of various interface protocols, such as an Advanced Technology Attachment (ATA) interface, a serial ATA (SATA) interface, an external SATA (e-SATA) interface, a Small Computer Small Interface (SCSI) interface, a Serial Attached SCSI (SAS) interface, a Peripheral Component Interconnection (PCI) interface, a PCI express (PCIe) interface, an NVM express (NVMe) interface, IEEE 1394, an Universal Serial Bus (USB) interface, a Secure Digital (SD) card, a Multi-Media Card (MMC) interface, an embedded Multi-Media Card (eMMC) interface, a Universal Flash Storage (UFS) interface, an embedded Universal Flash Storage (eUFS) interface, a Compact Flash (CF) card interface, and a network interface. The multi-protocol host interface circuit 210 may receive a signal based on a predetermined interface protocol from the host 11 and operate based on the received signal. Alternatively, the multi-protocol host interface circuit 210 may transmit a signal based on a predetermined interface protocol to the host 11.

The memory interface circuit 220 may be configured to communicate with the non-volatile memory device 120 according to a predetermined interface protocol. In an embodiment, the predetermined interface protocol may include at least one of various interface protocols, such as a toggle interface and an Open NAND Flash Interface (ONFI) interface. In an embodiment, the memory interface circuit 220 may communicate with the non-volatile memory device 120 based on a toggle interface. In this case, the memory interface circuit 220 may communicate with the non-volatile memory device 120 through a plurality of channels CHs. In an embodiment, each of the plurality of channels CHs may include a plurality of signal lines configured to transmit various control signals (e.g.,/chip enable (CE), command latch enable (CLE), address latch enable (ALE), /write enable (WE),/read enable (RE), ready/busy (R/B), etc.), data signals DQ, and a data strobe signal DQS.

The non-volatile memory device 120 may be configured to store data, output stored data, or erase stored data under the control of the storage controller 110. In an embodiment, the non-volatile memory device 120 may be a two-dimensional or three-dimensional NAND flash memory device, but the scope of the present disclosure is not limited thereto and the non-volatile memory device 120 may be a memory device based on magnetic RAM (MRAM), spin-transfer torque MRAM, conductive bridging RAM (CBRAM), ferroelectric RAM (FeRAM), phase-change RAM (PRAM), resistive RAM, or various other types of memory. In an embodiment, the non-volatile memory device 120 may include a plurality of non-volatile memories, and each of the plurality of non-volatile memories may be implemented as a separate chip or a separate package. The storage controller 110 may communicate with each of the plurality of non-volatile memories of the non-volatile memory device 120 through a plurality of channels.

As described above, the storage device 100 according to an embodiment may transmit data to and receive data from an external storage device (e.g., through a switch that connects the storage device 100 to the external storage device) in response to a P2P data transmission trigger request provided from the host 11.

FIG. 2 is a diagram illustrating a software layer of the storage system of FIG. 1. Referring to FIGS. 1 and 2, the software layer of the storage system 10 may include an application layer APP, a file system layer FS, an address manager AM, a device driver layer DD, an address translator 117, and a flash translation layer 112.

The application layer APP may include various application programs running on the host 11. The file system layer FS may be configured to organize files or data used by the application layer APP. For example, the file system layer FS may manage the storage space of the storage device 100 as a logical block address. The file system layer FS may assign and manage a logical block address to data stored in the storage device 100. In an embodiment, the file system layer FS may have different forms depending on the operating system (OS) of the host 11. The file system layer FS may include at least one of various file system types, such as File Allocation Table (FAT), FAT32, NT File System (NTFS), Hierarchical File System (HFS), Journaled File System2 (JSF2), XFS, On-Disk Structure-5 (ODS-5), UDF, ZFS, Unix File System (UFS), ext2, ext3, ext4, ReiserFS, Reiser4, ISO 9660, Gnome VFS, BFS, and WinFS.

The address manager AM may manage the storage space of the storage device 100 based on a host physical address. The address manager AM may convert a host physical address into a logical address or convert a logical address into a host physical address.

The device driver layer DD may perform an operation to convert information from the address manager AM, the file system layer FS, or the application layer APP into information that may be recognized by the storage device 100. In an embodiment, the application layer APP, the file system layer FS, the address manager AM, and the device driver layer DD may be implemented in a software form and may run on the host 11.

The address translator 117 may manage the storage space of the storage device 100 based on a device physical address. When receiving a host physical address from the device driver DD, the address translator 117 may convert the host physical address into a device physical address by referring to an H2D map. The device physical address may be used during a cache update operation. Furthermore, the address translator 117 may convert the device physical address into a logical address by referring to an L2D map. The FTL 112 may convert the converted logical address into a physical page address. The non-volatile memory 120 may perform internal operations on an area corresponding to the physical page address.

When receiving a logical address from the device driver DD, the address translator 117 may convert the logical address into a device physical address by referring to the L2D map. The device physical address may be used during a cache update operation. The FTL 112 may convert a logical address from the device driver DD into a physical page address. The non-volatile memory 120 may perform internal operations on an area corresponding to the physical page address.

In a typical storage system, a storage device only provides input/output requests in block or page units, which may be larger than the size of data that is required by the application layer APP. The input/output requests in block or page units are provided to a storage device through the file system layer FS. As the size of data required by the application layer APP is smaller than the block or page unit, the overhead of software layers increases and the transmission of unnecessary data increases. Accordingly, the performance of the application layer APP may be reduced and the power/energy efficiency of the entire storage system may be reduced.

The storage device 100 according to an embodiment may perform, by using the H2D map and the L2D map, a P2P transmission operation in response to a P2P data transmission trigger request in units (e.g., byte unit) smaller than a block or page unit as well as a P2P data transmission trigger request in the block or page unit.

By using the H2D map and the L2D map, the storage device 100 may perform a cache update operation in response to a P2P data transmission trigger request in units (e.g., byte unit) smaller than a block or page unit as well as a P2P data transmission trigger request in the block or page unit.

The application layer APP may trigger a P2P transmission operation between the storage device 100 and an external storage device by providing a P2P data transmission trigger request for data having a size less than a block or page unit.

Because only data having a size less than a block or page unit may be transmitted between the storage device 100 and an external storage device, unnecessary data transmission may be reduced. Accordingly, power/energy efficiency may be improved.

Figure 3:
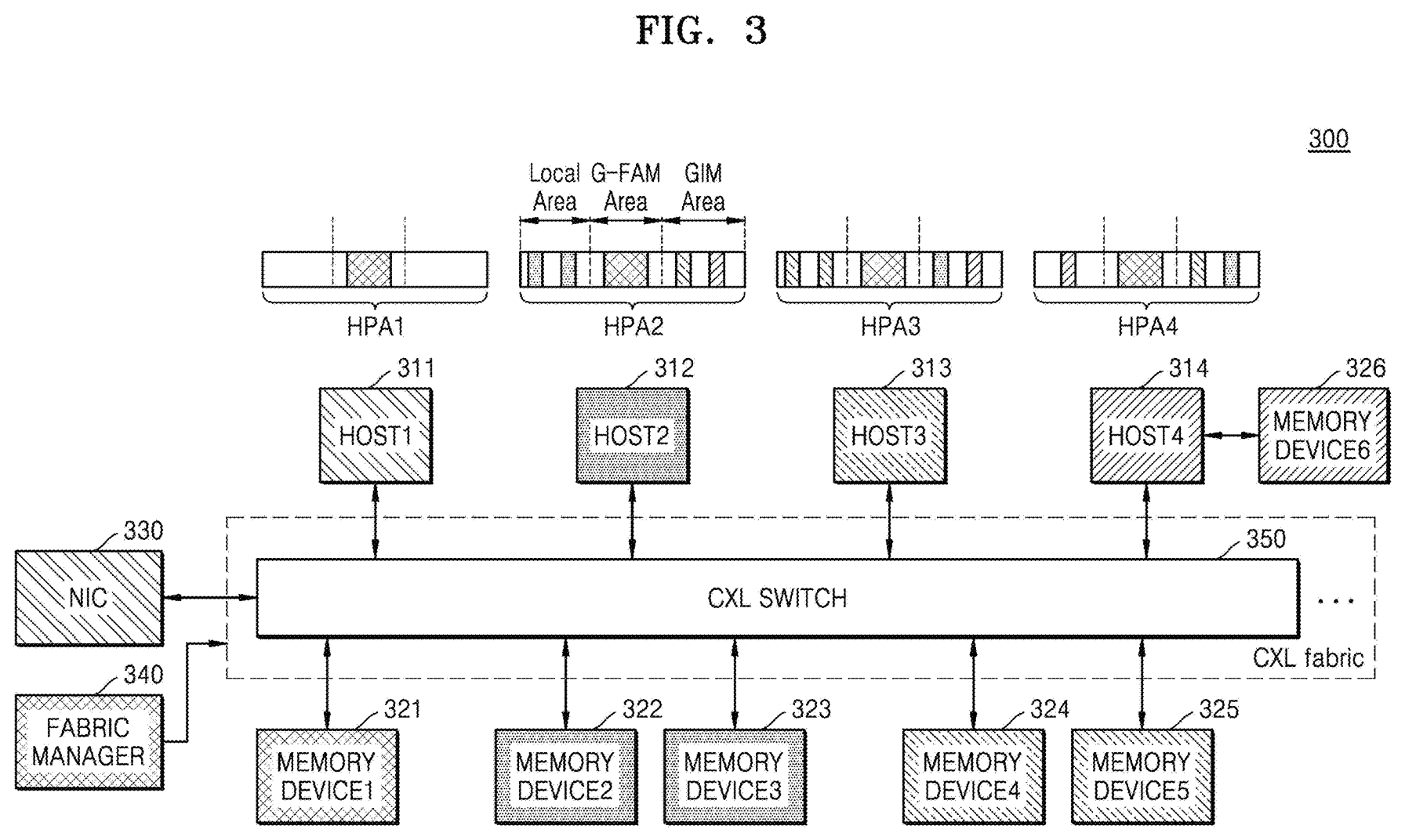

FIG. 3 is a diagram illustrating a computing system 300 according to an example embodiment.

Referring to FIG. 3, the computing system 300 may include first to fourth hosts 311 to 314, first to sixth memory devices 321 to 326, a network interface card (NIC) 330, a fabric manager 340, and a CXL switch 350. The CXL switch 350 may be included in a CXL fabric. Although not shown in the drawings, the CXL fabric may include a plurality of CXL switches. The fabric manager 340 may control all operations of the CXL fabric. The fabric manager 340 may store assignment information between the fabric manager 340, the first to fourth hosts 311 to 314, the NIC 330, and the first to sixth memory devices 321 to 326.

The first to fourth hosts 311 to 314, the first to sixth memory devices 321 to 326, and the NIC 330 may communicate with each other through the CXL switch 350.

In an embodiment, each of the first to fourth hosts 311 to 314 may be the host 11 described above with reference to FIGS. 1 and 2. Although not shown in the drawings, each of the first to fourth hosts 311 to 314 may be directly connected to individual memory devices. Each of the first to fifth memory devices 321 to 325 may be the storage device 100 described above with reference to FIGS. 1 and 2.

The CXL fabric may be connected to an external network or external fabric through the NIC 330 and may be configured to communicate with an external server through the external network or external fabric.

Referring to FIG. 3, the fabric manager 340 may be assigned to the first memory device 321, the first host 311 may be assigned to the NIC 330, the second host 312 may be assigned to the second and third memory devices 322 and 323, the third host 313 may be assigned to the fourth and fifth memory devices 324 and 325, and the fourth host 314 may be assigned to the sixth memory device 326. The first to fifth memory devices 321 to 325 may be referred to as "far local" memory devices connected to the fabric manager 340 and the first to third hosts 311 to 313 through the CXL switch 350. The sixth memory device 326 may be referred to as a "near local" memory device directly connected to the fourth host 314.

The first to fourth hosts 311 to 314 may manage first to fourth host physical addresses HPA1 to HPA4, respectively.

That is, each of the first to fourth hosts 311 to 314 may manage a unique host physical address.

For example, the second host physical address HPA2 may include a local area, a Global Fabric-Attached Memory (G-FAM) area, and a Global Integrated Memory (GIM) area.

The local area may be an address area mapped to the device physical addresses of the second and third memory devices 322 and 323 assigned to the second host 312.

The G-FAM area may be an address area mapped to the device physical address of a G-FAM device (e.g., the first memory device 321).

The GIM area may be an address area mapped to the device physical address of the fourth to sixth memory devices 324, 325, and 326 assigned to other hosts, i.e., the third and fourth hosts 313 and 314.

As described above with reference to FIGS. 1 and 2, each of the first to fourth hosts 311 to 314 may trigger a P2P transmission operation between the first to sixth memory devices 321 to 326 by providing a P2P data transmission trigger request. Each of the first to fourth hosts 311 to 314 may maintain cache coherence between the first to sixth memory devices 321 to 326 by providing cache update information.

Figure 4:
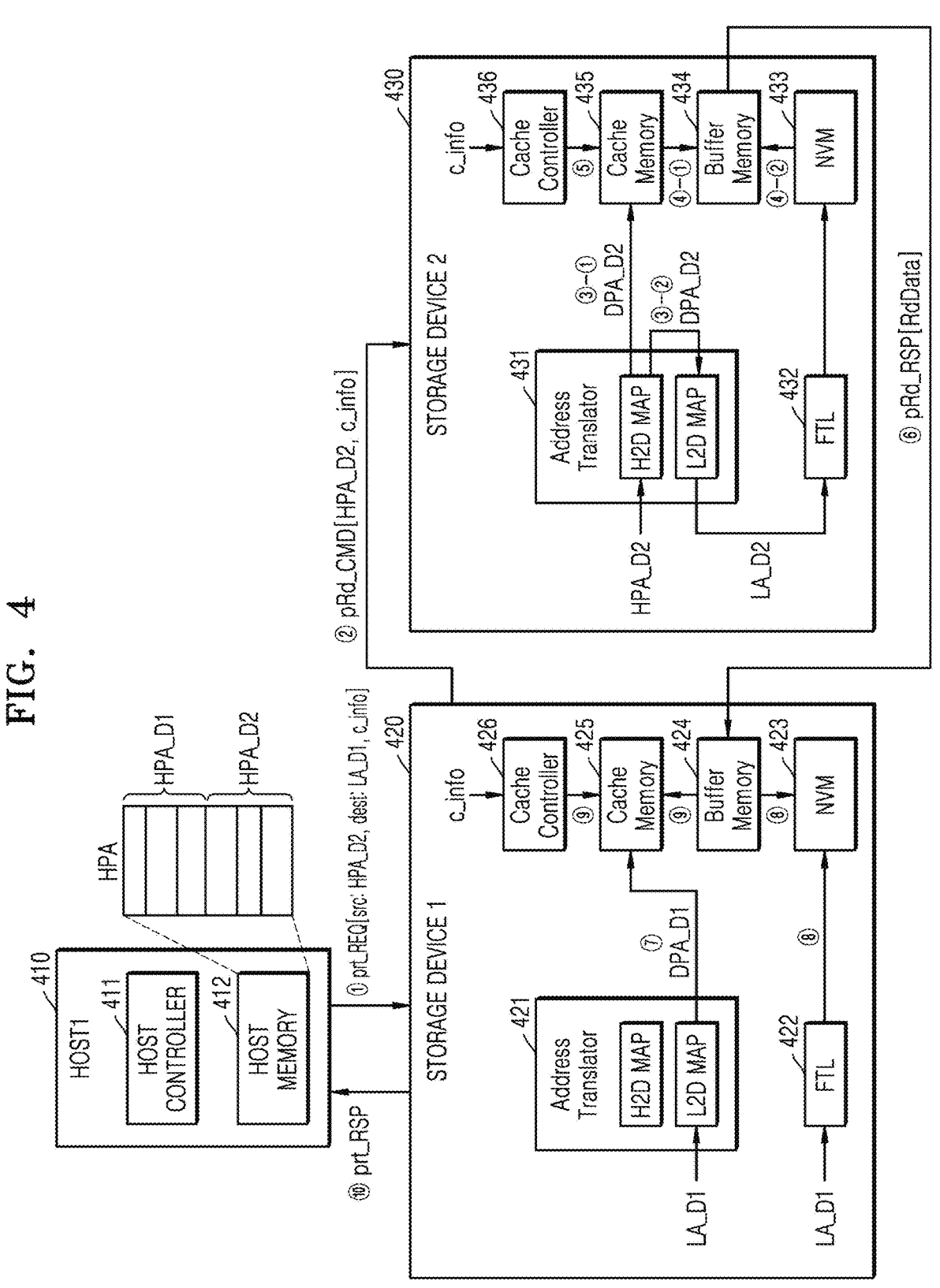
FIG. 4 is a diagram illustrating a peer-to-peer (P2P) read operation according to an example embodiment.

FIG. 4 is a diagram illustrating a P2P read operation according to an example embodiment.

Referring to FIG. 4, a first host 410 may be connected to first and second storage devices 420 and 430 through a CXL switch. The first host 410 may correspond to the host 11 of FIGS. 1 and 2. Each of the first and second storage devices 420 and 430 may correspond to the storage device 100 of FIGS. 1 and 2. In some embodiments, the first and second storage devices 420 and 430 may be external to each other.

The first host 410 may manage a host physical address HPA. The host memory 412 may store the host physical address HPA. The host physical address HPA may include a first host physical address HPA_D1 and a second host physical address HPA_D2. The first host physical address HPA_D1 may be an address area mapped to a device physical address DPA_D1 of the first storage device 420. The second host physical address HPA_D2 may be an address area mapped to a device physical address DPA_D2 of the second storage device 430.

The first host 410 may provide a P2P read trigger request prt_REQ to the first storage device 420 (①)) (e.g., to a multi-protocol host interface circuit 210 (FIG. 1) thereof). The P2P read trigger request prt_REQ may include a source address src (which may identify/be related to an external storage device that is connected to the first storage device 420 through a switch, such as the switch 350 (FIG. 3)), a destination address dest (which may identify/be related to the first storage device 420), and cache update information c_info (which may indicate an update method of the cache memory 425). As an example, the P2P read trigger request prt_REQ may include an unordered IO (UIO) packet of CXL.io, and the cache update information c_info may be included in a reserved field of the UIO packet. As an example, the cache update information c_info may be included in a PCIe packet (e.g., an NVMe command). The source address src may be a second host physical address HPA_D2, and the destination address dest may be a logical address LA_D1. The logical address LA_D1 is a logical address managed by the first host 410 and may indicate a storage space of the first storage device 420. The first host 410 may access the storage space of the first storage device 420 by using the logical address LA_D1 or the first host physical address HPA_D1. In some embodiments, the P2P read trigger request prt_REQ may be referred to herein as a "first request," and the multi-protocol host interface circuit 210 may be configured to provide a second request including the source address src to the external storage device that is connected to the first storage device 420 through a switch. Moreover, the multi-protocol host interface circuit 210 may be configured to receive, from the external storage device in response to the second request, a response including data corresponding to the source address src.

The first storage device 420 may provide a read command pRd_CMD (e.g., the "second request") including the second host physical address HPA_D2 and the cache update information c_info to the second storage device 430 (②). As an example, the read command pRd_CMD may include a CXL.mem packet, and the cache update information c_info may be included in a reserved field of the CXL.mem packet. As an example, the read command pRD_CMD may include an UIO packet, and the cache update information c_info may be included in a reserved field of the UIO packet. In some embodiments, the read command pRd_CMD may be generated by a Direct Memory Access (DMA) circuit included in the first storage device 420. Furthermore, the first storage device 420 may activate a buffer memory 424 so that data received from the second storage device 430 may be stored in the buffer memory 424.

An address translator 431 included in the second storage device 430 may convert the second host physical address HPA_D2 included in the read command pRd_CMD into a device physical address DPA_D2 of the second storage device 430 (③-①). Specifically, the address translator 431 may generate a device physical address DPA_D2 of the second storage device 430 that is mapped to the second host physical address HPA_D2 by referring to an H2D map. The embodiment is not limited thereto, and the address translator 431 may generate the device physical address DPA_D2 by using an H2D mapping algorithm.

The address translator 431 may refer to an L2D map and generate a logical address LA_D2 mapped to the device physical address DPA_D2 (③-②). The logical address LA_D2 may be a logical address for the second storage device 430 managed by a host (e.g., the second host) assigned to the second storage device 430. In some embodiments, an L2D map may be provided to the storage device 430 upon initialization of the second storage device 430. The logical address LA_D2 may be provided to an FTL 432.

Among the cache lines included in a cache memory 435, a cache line indicated by the second device physical address DPA_D2 may be transferred to a buffer memory 434 (④-①). Specifically, a cache controller 436 may convert the second device physical address DPA_D2 into the index of a cache line, and when a cache line having the converted index exists (cache hit), the cache controller 436 may provide data of the cache line to the buffer memory 434. In some embodiments, only some (and thus not all) of the data indicated by the second host physical address HPA_D2 may be stored in the cache memory 435. Accordingly, the cache controller 436 may provide the data stored in the cache memory 435 among the data indicated by the second host physical address HPA_D2 to the buffer memory 434.

The FTL 432 may generate a physical page address based on the logical address LA_D2, and a non-volatile memory 433 may read data from the storage area indicated by the physical page address and provide the read data to the buffer memory 434 (④-②). The non-volatile memory 433 may provide data other than data cached in the cache memory 435 to the buffer memory 434. That is, when a cache line corresponding to the second device physical address DPA_D2 does not exist in the cache memory 435 (cache miss), the FTL 432 may read data corresponding to the second device physical address DPA_D2 from the non-volatile memory 433 based on the logical address LA_D2. In some embodiments, only some (and thus not all) of the data indicated by the second host physical address HPA_D2 may be stored in the cache memory 435. Accordingly, the FTL 432 may read data not stored in the cache memory 435 from among the data indicated by the second host physical address HPA_D2 from the non-volatile memory 433 and provide the read data to the buffer memory 434. The size of the data indicated by the second device physical address DPA_D2 may be less than the size of the data indicated by the logical address LA_D2. For example, the size of the data indicated by the second device physical address DPA_D2 may be 64 bytes, and the size of the data indicated by the logical address LA_D2 may be N kilobytes (N is a natural number).

The cache controller 436 may perform a cache update operation on the cache memory 435 based on the cache update information c_info (⑤). Specifically, when the cache update information c_info indicates an invalidation operation, the cache controller 436 may invalidate a cache line corresponding to the data stored in the buffer memory 434. When the cache update information c_info indicates a partial update operation, the cache controller 436 may update some (but not all) of the data stored in the buffer memory 434 to the cache line. When the cache update information c_info indicates a full update operation, the cache controller 436 may update all of the data stored in the buffer memory 434 to the cache line.

The second storage device 430 may provide a read response pRd_RSP including data RdData stored in the buffer memory 434 to the first storage device 420 (⑥). The data RdData may be stored in the buffer memory 424 in the first storage device 420.

The address translator 421 of the first storage device 420 may convert the logical address LA_D1 into a first device physical address DPA_D1 by referring to an L2D map (⑦). Accordingly, the address translator 421 (which may comprise an address translation circuit) may be configured to generate a physical address of a first type (i.e., the first device physical address DPA_D1) based on the destination address dest (which may be the logical address LA_D1). In some embodiments, an L2D map may be provided to the storage device 420 upon initialization of the first storage device 420. Moreover, according to some embodiments, the address translator 421 may be configured to convert the destination address dest into the physical address of the first type (i.e., the first device physical address DPA_D1) when the destination address dest is a logical address (e.g., the logical address LA_D1) indicating data in block units.

The logical address LA_D1 may be provided to an FTL 422, and the FTL 422 may convert the logical address LA_D1 into a physical page address of a non-volatile memory 423 (⑧). Accordingly, the FTL 422 may be configured to convert the destination address dest (which may be the logical address LA_D1) into a physical address of a second type indicating a storage area of the non-volatile memory 423. The non-volatile memory 423 may store the data RdData of the buffer memory 424 in a storage area indicated by the physical page address (⑧). Accordingly, the non-volatile memory 423 may be configured to store data stored in the buffer memory 424 in a storage area indicated by the physical address of the second type.

A cache controller 426 may update the data RdData to a cache line (i.e., a cache area) indicated by the first device physical address DPA_D1 from among the cache lines of a cache memory 425 (⑨). Specifically, the cache controller 426 may perform an update operation based on cache update information c_info. When the cache update information c_info indicates an invalidation operation, the cache controller 426 may invalidate a cache line indicated by the first device physical address DPA_D1 in the buffer memory 424. When the cache update information c_info indicates a partial update operation, the cache controller 426 may update some (but not all) of the data RdData stored in the buffer memory 424 to the cache line. When the cache update information c_info indicates a full update operation, the cache controller 426 may update all of the data stored in the buffer memory 424 to the cache line.

The first storage device 420 may provide a P2P read response prt_RSP to the P2P read trigger request prt_REQ to the first host 410 (⑩).

Figure 5:
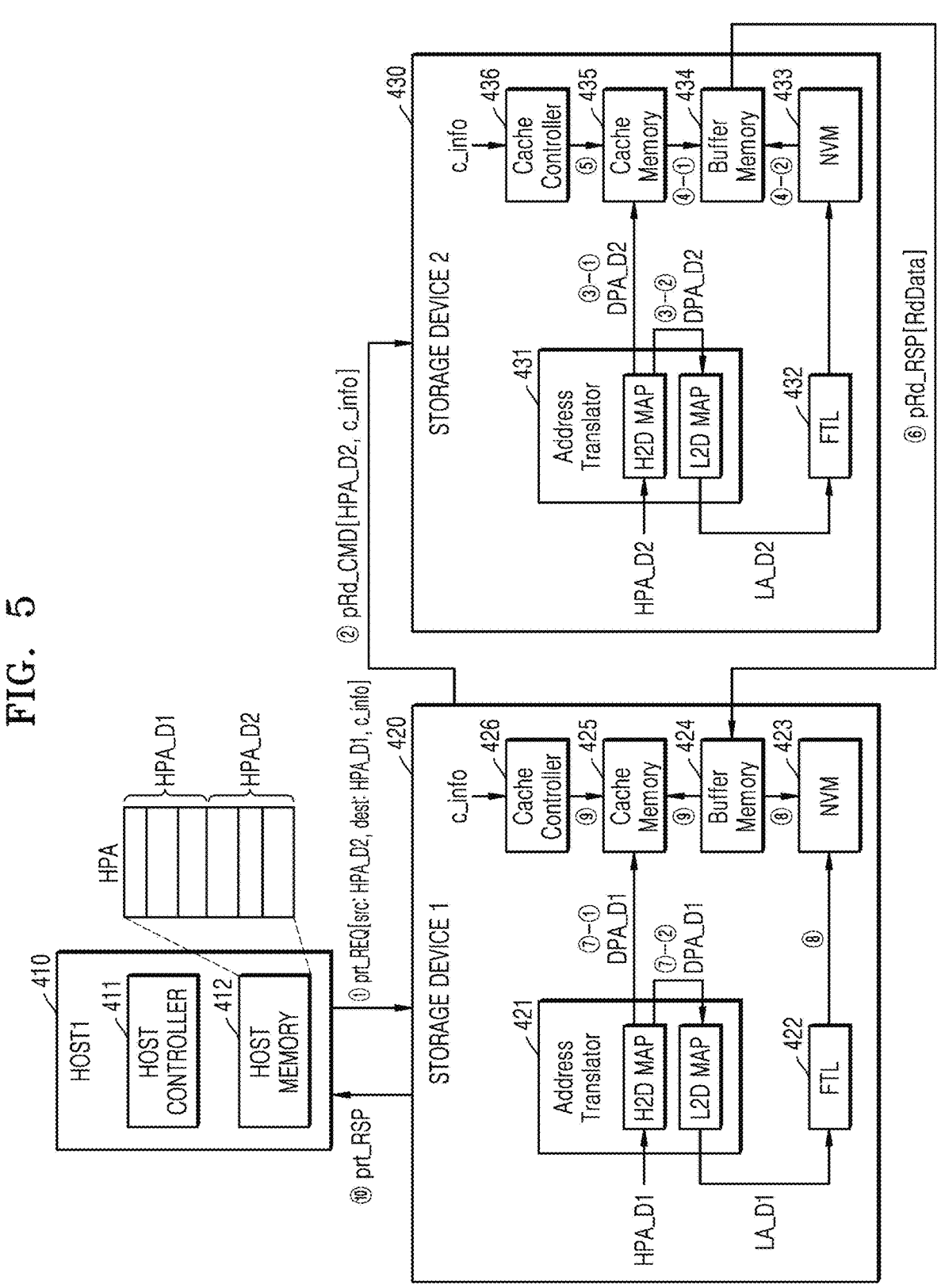
FIG. 5 is a diagram illustrating a P2P read operation according to an example embodiment.

FIG. 5 is a diagram illustrating a P2P read operation according to an example embodiment.

Referring to FIG. 5, unlike in FIG. 4, the destination address dest included in the P2P read trigger request prt_REQ may be a first host physical address HPA_D1.

Therefore, the address translator 421 may convert the first host physical address HPA_D1 into a first device physical address DPA_D1 with reference to the H2D map (⑦-①) and may convert the first device physical address DPA_D1 into a logical address LA_D1 by referring to the L2D map (⑦-①). In some embodiments, the address translator 421 may be configured to convert the destination address dest into the first device physical address DPA_D1 (i.e., the physical address of the first type), and to convert the first device physical address DPA_D1 into a logical address (e.g., the logical address LA_D1) indicating data in block units, when the destination address dest is a host physical address (e.g., the first host physical address HPA_D1) indicating data in units smaller than a block unit.

That is, the first storage device 420 may provide a P2P read operation function for the logical address LA_D1 and the first host physical address HPA_D1 by performing address conversion based on the L2D map.

Figure 6:
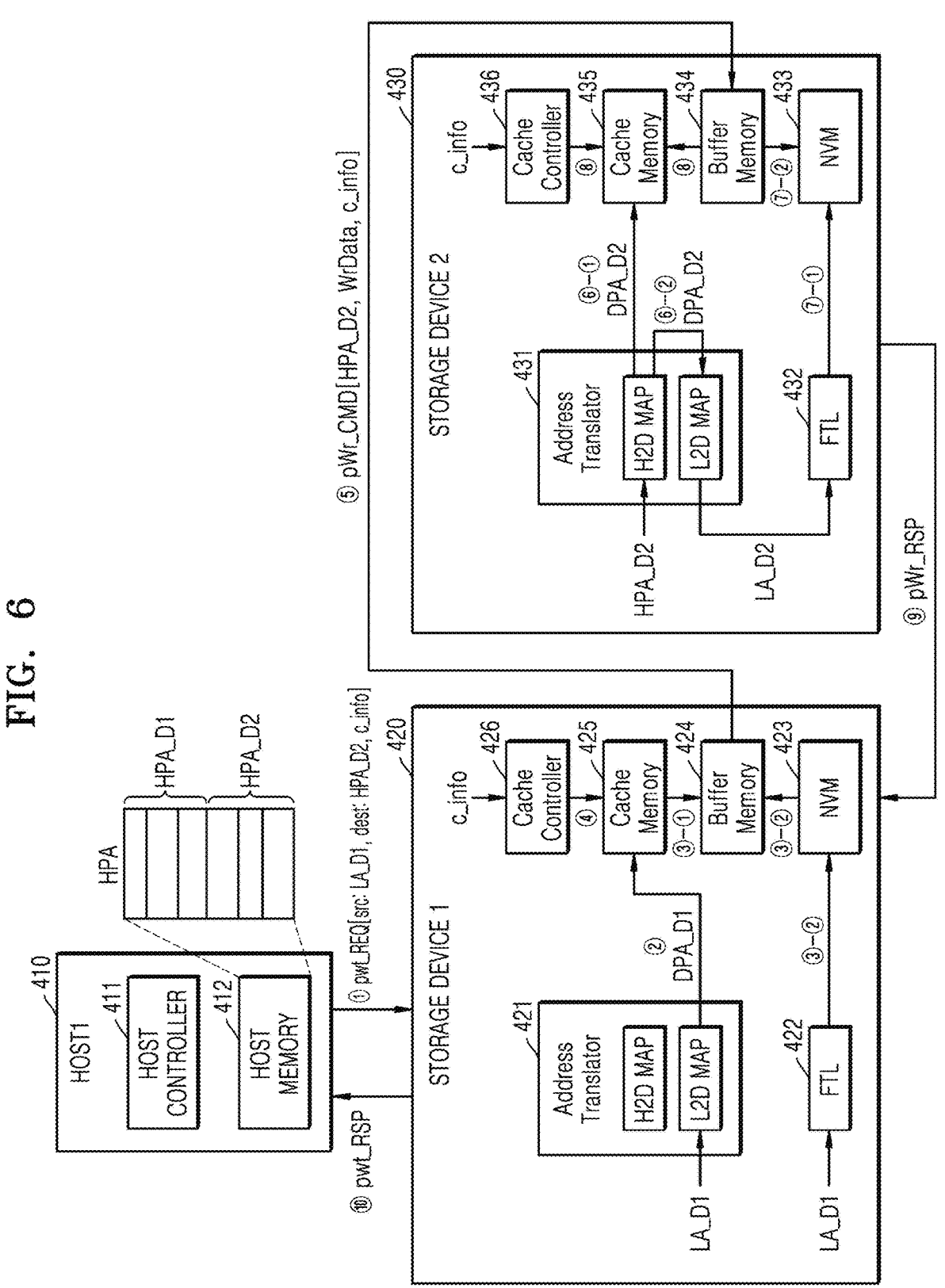
FIG. 6 is a diagram illustrating a P2P write operation according to an example embodiment.

FIG. 6 is a diagram illustrating a P2P write operation according to an example embodiment.

Referring to FIG. 6, the first host 410 may provide a P2P write trigger request pwt_REQ to the first storage device 420 (①). The P2P write trigger request pwt_REQ may include a source address src, a destination address dest, and cache update information c_info. As an example, the P2P write trigger request pwt_REQ may include an UIO packet of CXL.io, and the cache update information c_info may be included in a reserved field of the UIO packet. The source address src may be a logical address LA_D1, and the destination address dest may be a second host physical address HPA_D2. The logical address LA_D1 is a logical address managed by the first host 410 and may indicate a storage space of the first storage device 420. The first host 410 may access the storage space of the first storage device 420 by using the logical address LA_D1 or the first host physical address HPA_D1. The second host physical address HPA_D2 may be an address area mapped to the device physical address DPA_D2 of the second storage device 430.

The address translator 421 of the first storage device 420 may convert the logical address LA_D1 into a first device physical address DPA_D1 (which may be a physical address of a first type) by referring to an L2D map (②).

Among the cache lines included in the cache memory 425, a cache line (e.g., a cache area) indicated by the first device physical address DPA_D1 may be transferred to the buffer memory 424 (③-①). Specifically, the cache controller 426 may convert the first device physical address DPA_D1 into the index of a cache line, and when a cache line having the converted index exists (cache hit), the cache controller 426 may provide data of the cache line to the buffer memory 424. In some embodiments, only some (and thus not all) of the data indicated by the logical address LA_D1 may be stored in the cache memory 425. Accordingly, the cache controller 426 may provide the data stored in the cache memory 425 among the data indicated by the logical address LA_D1 to the buffer memory 424.

The FTL 422 may generate a physical page address based on the logical address LA_D1, and the non-volatile memory 423 may read data from the storage area indicated by the physical page address and provide the read data to the buffer memory 424 (③-②). That is, when a cache line corresponding to the first device physical address DPA_D1 does not exist in the cache memory 425 (cache miss), the FTL 422 may read data corresponding to the first device physical address DPA_D1 from the non-volatile memory 423 based on the logical address LA_D1. In some embodiments, the non-volatile memory 423 may provide data other than data cached in the cache memory 425 to the buffer memory 424. That is, only some (and thus not all) of the data indicated by the logical address LA_D1 may be stored in the cache memory 425. Accordingly, the FTL 422 may read data not stored in the cache memory 425 from among the data indicated by the logical address LA_D1 from the non-volatile memory 423 and provide the read data to the buffer memory 424. The size of the data indicated by the first device physical address DPA_D1 may be less than the size of the data indicated by the logical address LA_D1. For example, the size of the data indicated by the first device physical address DPA_D1 may be 64 bytes, and the size of the data indicated by the logical address LA_D1 may be N kilobytes (N is a natural number).

The cache controller 426 may perform a cache update operation on the cache memory 425 based on the cache update information c_info (④). Specifically, when the cache update information c_info indicates an invalidation operation, the cache controller 426 may invalidate a cache line indicated by the first device physical address DPA_D1. When the cache update information c_info indicates a partial update operation, the cache controller 426 may update some (but not all) of the data stored in the buffer memory 424 to the cache line. When the cache update information c_info indicates a full update operation, the cache controller 426 may update all of the data stored in the buffer memory 424 to the cache line.

The first storage device 420 may provide a write command pWr_CMD including a second host physical address HPA_D2, data WrData stored in the buffer memory 424, and the cache update information c_info to the second storage device 430 (⑤). As an example, the write command pWr_CMD may include a CXL.mem packet, and the cache update information c_info may be included in a reserved field of the CXL.mem packet. In some embodiments, the write command pWr_CMD may be generated by a DMA circuit included in the first storage device 420.

The address translator 431 of the second storage device 430 may convert the second host physical address HPA_D2 into a second device physical address DPA_D2 (which may be a physical address of a first type) by referring to the H2D map (⑥-①).

The address translator 431 may convert the second device physical address DPA_D2 into a logical address LA_D2 by referring to the L2D map (⑥-②).

The FTL 432 may convert the logical address LA_D2 into a physical page address by referring to the L2P map (⑦-①). The non-volatile memory 433 may store the data WrData stored in the buffer memory 434 in a storage area indicated by the physical page address (⑦-②).

The cache controller 436 may update the data WrData to a cache line indicated by the second device physical address DPA_D2 from among the cache lines of the cache memory 435 (⑧). Specifically, the cache controller 436 may perform an update operation based on the cache update information c_info. When the cache update information c_info indicates an invalidation operation, the cache controller 436 may invalidate a cache line indicated by the second device physical address DPA_D2 in the buffer memory 434. When the cache update information c_info indicates a partial update operation, the cache controller 436 may update some of the data WrData stored in the buffer memory 434 to the cache line. When the cache update information c_info indicates a full update operation, the cache controller 436 may update all of the data WrData stored in the buffer memory 434 to the cache line.

The second storage device 430 may provide a write response pWr_RSP corresponding to the write command pWr_CMD to the first storage device 420 (⑨).

The first storage device 420 may provide a P2P write response pwt_RSP to the P2P write trigger request pwt_REQ to the first host 410 (⑩).

Figure 7:
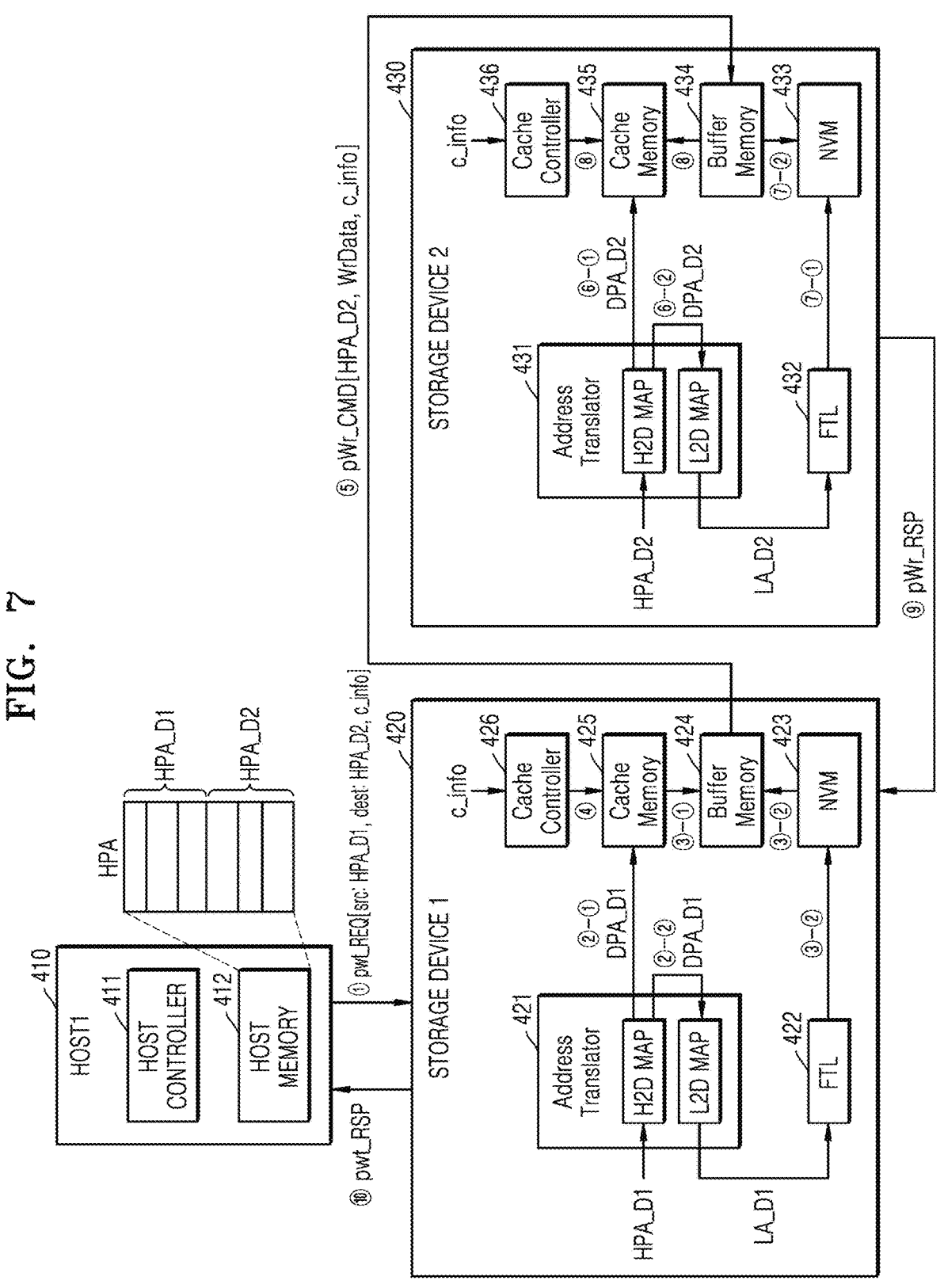
FIG. 7 is a diagram illustrating a P2P write operation according to an example embodiment.

FIG. 7 is a diagram illustrating a P2P write operation according to an example embodiment.

Referring to FIG. 7, unlike in FIG. 6, the source address src included in the P2P write trigger request pwt_REQ may be a first host physical address HPA_D1.

Therefore, the address translator 421 may convert the first host physical address HPA_D1 into a first device physical address DPA_D1 with reference to the H2D map (②-①) and may convert the first device physical address DPA_D1 into a logical address LA_D1 by referring to the L2D map (②-②).

That is, the first storage device 420 may provide a P2P write operation function for the logical address LA_D1 and the first host physical address HPA_D1 by performing address conversion based on the L2D map.

Figure 8:
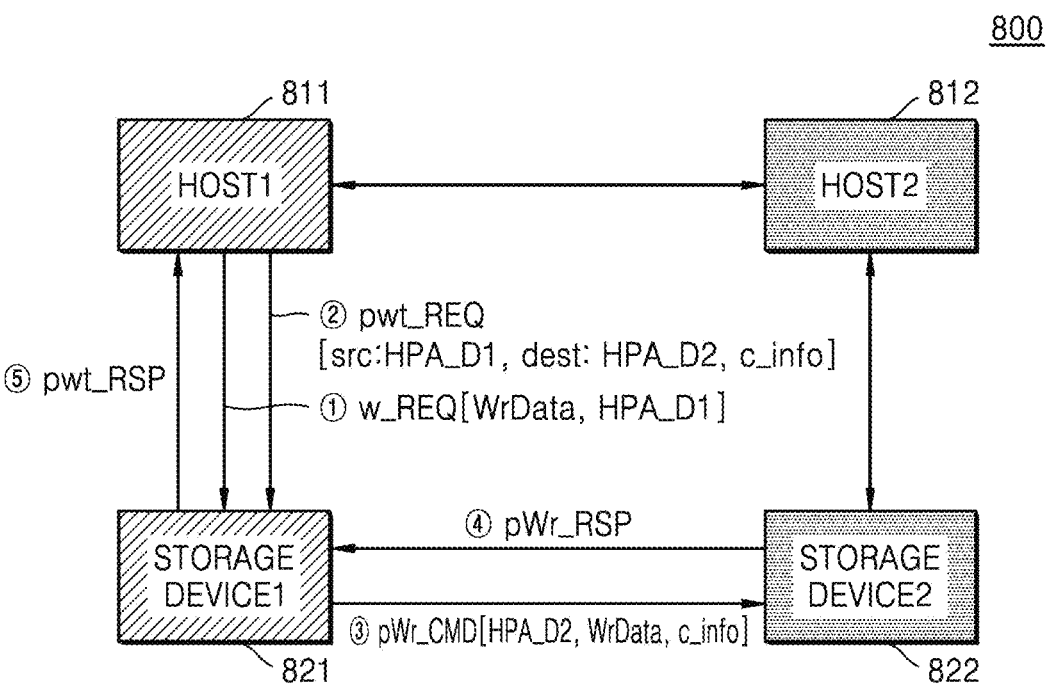
FIG. 8 is a diagram illustrating a computing system according to an example embodiment.

FIG. 8 is a diagram illustrating a computing system 800 according to an example embodiment.

Referring to FIG. 8, a first host 811 and a second host 812 may communicate with each other. The first host 811, the second host 812, a first storage device 821, and a second storage device 822 may be interconnected through a CXL switch.

The first host 811 may provide a write request w_REQ to the first storage device 821 (①). The first storage device 821 may store write data WrData provided in the write request w_REQ in a storage area indicated by a first host physical address HPA_D1.

The first host 811 may provide a P2P write trigger request pwr_REQ to the first storage device 821 (②). That is, when the first host 811 determines that the write data WrData is important data, the first host 811 may provide the P2P write trigger request pwr_REQ to the first storage device 821 to be copied to the second storage device 822. The P2P write trigger request pwr_REQ may include a first host physical address HPA_D1 as a source address, a second host physical address HPA_D2 as a destination address, and cache update information c_info.

The first storage device 821 may provide a P2P write command pWr_CMD to the second storage device 822 (③). The P2P write command pWr_CMD may include a second host physical address HPA_D2, which is a destination address, write data WrData, and cache update information c_info.

The second storage device 822 may store the write data WrData in a storage area indicated by the second host physical address HPA_D2 and provide a P2P write response pWr_RSP to the first storage device 821 (④).

The first storage device 821 may provide a P2P write trigger response pwt_RSP to the first host 811 (⑤).

Figure 9:
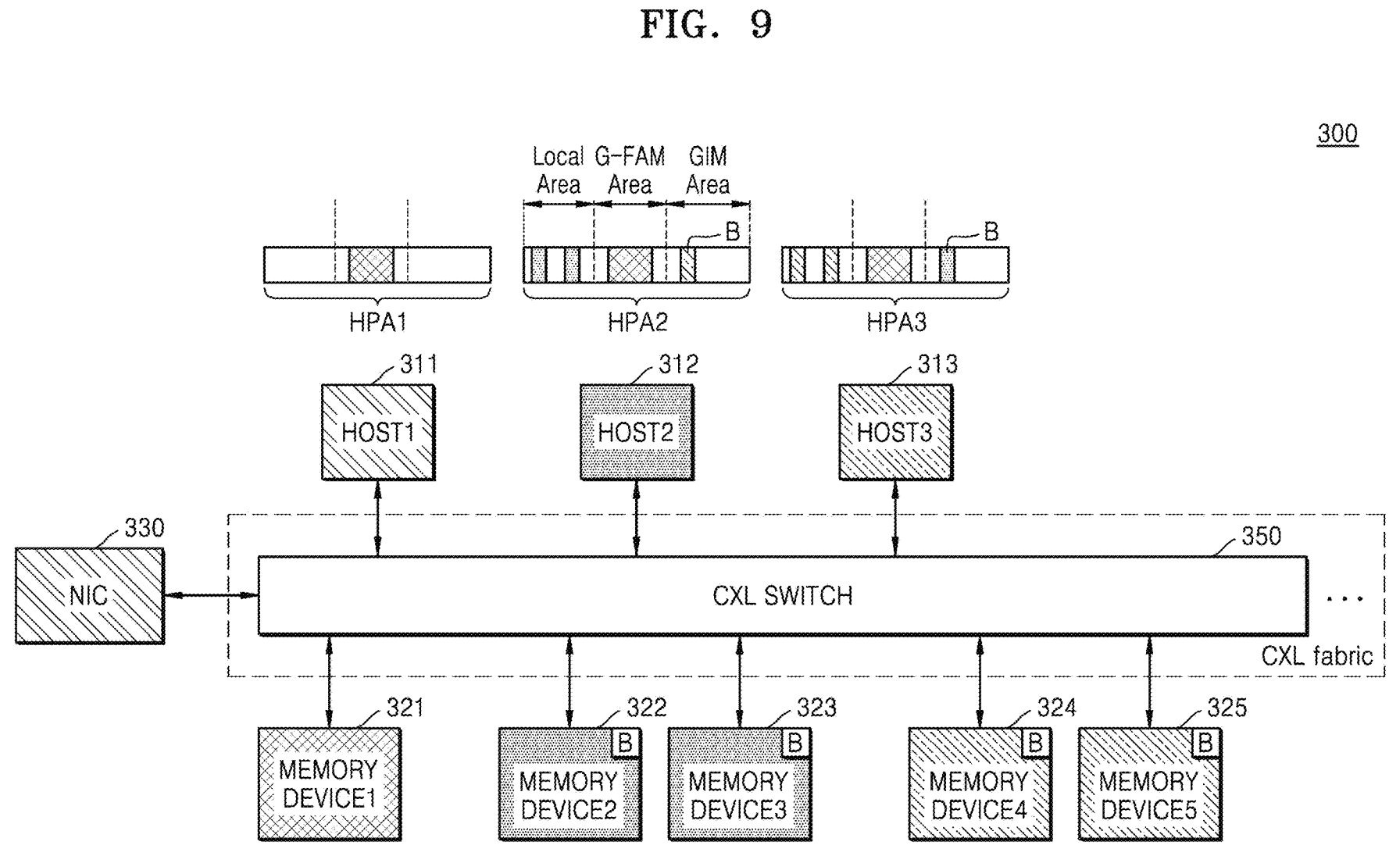

FIG. 9 is a diagram illustrating a computing system 300 according to an example embodiment.

Referring to FIG. 9, second to fourth memory devices 322 to 325 may include a buffer area B. The size of the buffer area B may be less than the size of the device physical address of each of the second to fourth memory devices 322 to 325.

A second host 312 may allocate an address corresponding to the buffer area B of the fourth and fifth memory devices 324 and 325 to a GIM area of a second host physical address HPA2. The second host 312 may use, as a source address or a destination address, the address corresponding to the buffer area B in the GIM area of the second host physical address HPA2.

A third host 313 may allocate an address corresponding to the buffer area B of the second and third memory devices 322 and 323 to a GIM area of a third host physical address HPA3. The third host 313 may use, as a source address or a destination address, the address corresponding to the buffer area B in the GIM area of the third host physical address HPA3.

Because the address range allocated to the second and third host physical addresses HPA2 and HPA3 is reduced, the address management overhead of the second and third hosts 312 and 313 may be reduced.

Figure 10:
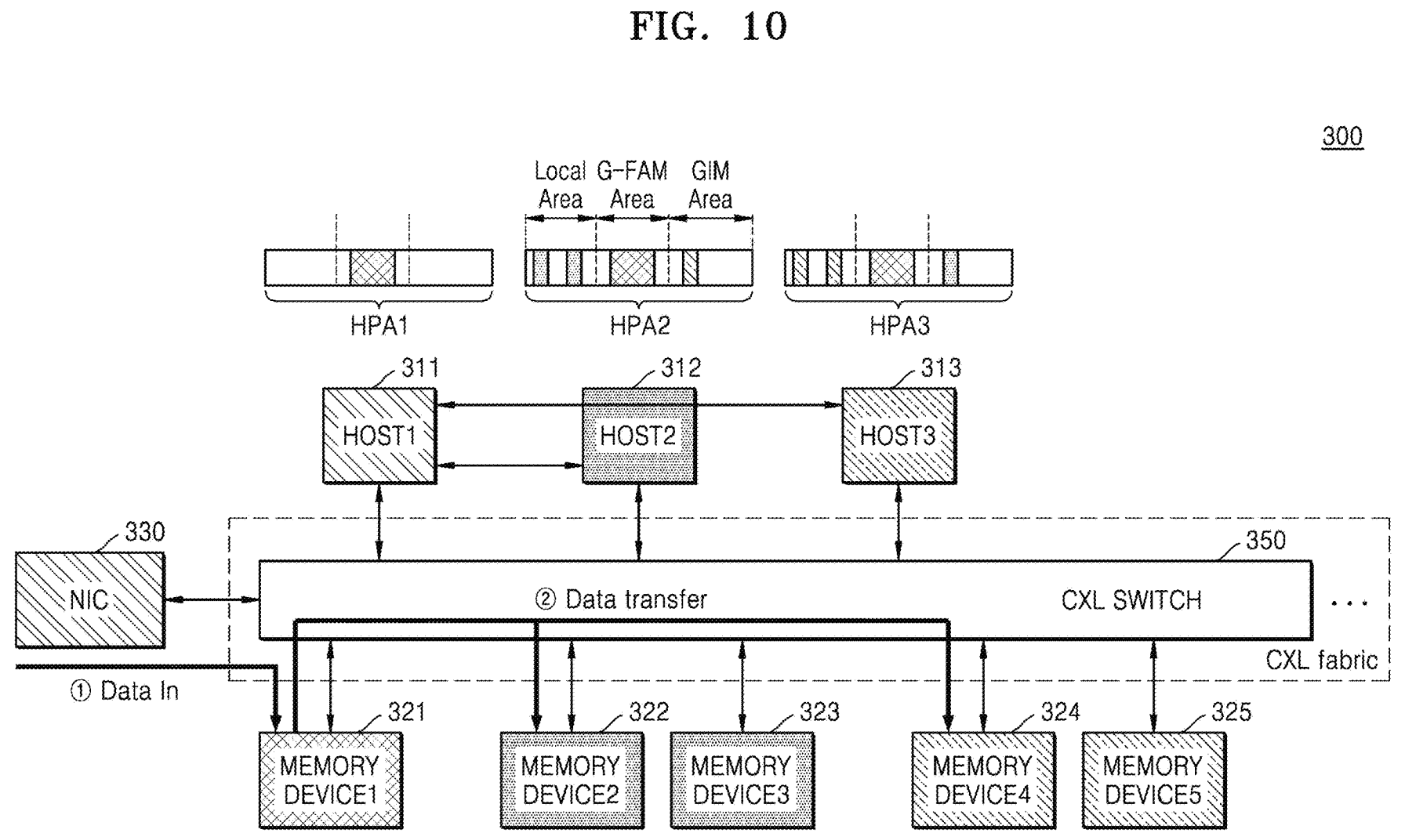

FIG. 10 is a diagram illustrating a computing system 300 according to an example embodiment.

Referring to FIG. 10, data may be received through an NIC 330, and the received data may be stored in a first memory device 321 (①). Specifically, a first host 311 may be assigned to the NIC 330, and the first host 311 may access the first memory device 321 by using the address of a G-FAM area.

Data stored in the first memory device 321 may be transmitted to second and fourth memory devices 322 and 324 through a P2P data transmission operation (②). Specifically, the first host 311 may provide a data replication signal to a second host 312 and a third host 313.

The second host 312 may receive the data replication signal and may provide a P2P read trigger request to the second memory device 322 so that data is transferred from the first memory device 321 to the second memory device 322. The second host 312 may use the address of a local area of a second host physical address HPA2 as a destination address of the second memory device 322. The second host 312 may use the address of a G-FAM area of the second host physical address HPA2 as a source address.

The third host 313 may receive the data replication signal and provide a P2P read trigger request to the fourth memory device 324 so that data is transferred from the first memory device 321 to the fourth memory device 324. The third host 313 may use the address of a local area of a third host physical address HPA3 as a destination address of the fourth memory device 324. The third host 313 may use the address of a G-FAM area of the third host physical address HPA3 as a source address.

Figure 11:
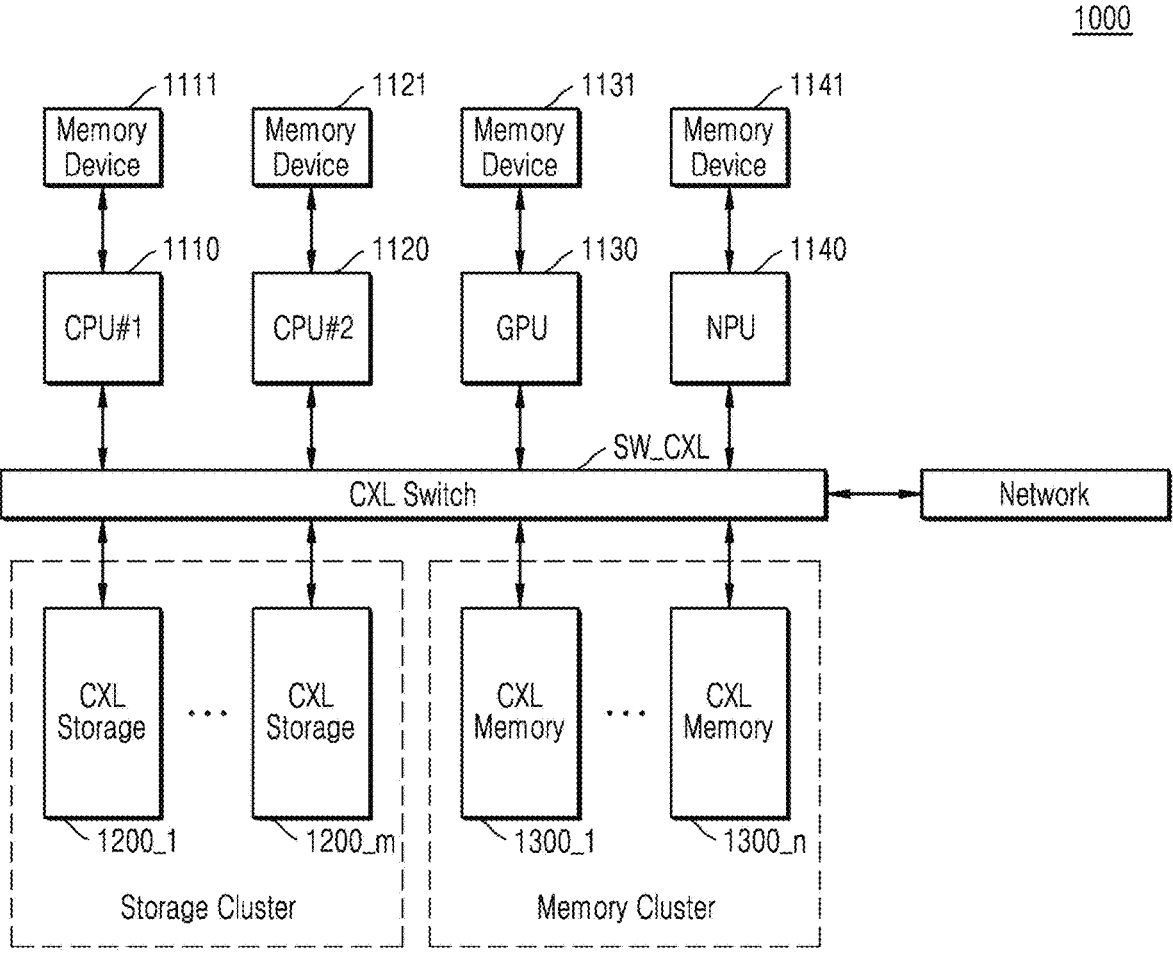
FIG. 11 is a block diagram of a computing system according to an embodiment.

FIG. 11 is a block diagram of a computing system 1000 according to an embodiment.

For convenience of description, repeated detailed description of the components given above is omitted. Referring to FIG. 11, the computing system 1000 may include a first CPU 1110, a second CPU 1120, a GPU 1130, an NPU 1140, a CXL switch SW_CXL, a plurality of memory devices 1111, 1121, 1131, and 1141, a plurality of CXL storages 1200_1 to 1200_m, and a plurality of CXL memories 1300_1 to 1300_n.

The first CPU 1110, the second CPU 1120, the GPU 1130, and the NPU 1140 may be directly connected to the plurality of memory devices 1111, 1121, 1131, and 1141, respectively.

The first CPU 1110, the second CPU 1120, the GPU 1130, the NPU 1140, the plurality of CXL storages 1200_1 to 1200_m, and the plurality of CXL memories 1300_1 to 1300_n may be commonly connected to the CXL switch SW_CXL and may communicate with each other through the CXL switch SW_CXL.

In an embodiment, the first CPU 1110, the second CPU 1120, the GPU 1130, and the NPU 1140 may each be a host (e.g., the host 11, 311, 312, 313, 314, 410, 811, or 812) described with reference to FIGS. 1 to 10.

In an embodiment, the first CPU 1110, the second CPU 1120, the GPU 1130, and the NPU 1140 may each manage the plurality of CXL storages 1200_1 to 1200_m as one storage cluster and the plurality of CXL memories 1300_1 to 1300_n as one memory cluster.

In an embodiment, each of the plurality of CXL storages 1200_1 to 1200_m may be a storage device or memory device (e.g., the storage device or memory device 100, 321, 322, 323, 324, 325, 420, 430, 821, or 822) described with reference to FIGS. 1 to 10.

According to an example embodiment of the present disclosure, each of the CXL storages 1200_1 to 1200_m may receive a P2P data transmission trigger request from the first CPU 1110, the second CPU 1120, the GPU 1130, or the NPU 1140 and may perform a P2P data transmission operation, described above with reference to FIGS. 1 to 10, in response to the P2P data transmission trigger request.

In an embodiment, the CXL switch SW_CXL may be connected to an external network or fabric and may be configured to communicate with an external server through the external network or fabric.

While the inventive concept has been particularly shown and described with reference to embodiments thereof, it will be understood that various changes in form and details may be made therein without departing from the scope of the following claims.

What is claimed is:

1. A storage device connected to an external storage device through a switch, the storage device comprising:
   a non-volatile memory; and
   a storage controller,
   wherein the storage controller comprises:
   a cache memory configured to store some of data stored in the non-volatile memory;
   an interface circuit configured to receive, from a first external host from among a plurality of external hosts, a first request including a source address related to the external storage device, a destination address related to the storage device, and cache update information indicating an update method of the cache memory, provide a second request including the source address to the external storage device, and receive, from the external storage device in response to the second request, a response including first data corresponding to the source address;

a buffer memory configured to temporarily store the first data received from the external storage device;

an address translation circuit configured to generate a physical address of a first type based on the destination address; and a cache controller configured to update a cache area indicated by the physical address of the first type based on the cache update information.

2. The storage device of claim 1, wherein the cache controller is further configured to, based on the cache update information, update some of the first data to the cache area, update all of the first data to the cache area, or invalidate the cache area.

3. The storage device of claim 1, wherein the address translation circuit is further config-ured to convert the destination address into the physical address of the first type when the destination address is a logical address indicating data in block units, wherein the storage controller further comprises a flash translation layer configured to convert the destination address into a physical address of a second type indi-cating a storage area of the non-volatile memory, and wherein the non-volatile memory is configured to store the first data stored in the buffer memory in a storage area indicated by the physical address of the second type.

4. The storage device of claim 1, wherein the address translation circuit is further config-ured to convert the destination address into the physical address of the first type and the physical address of the first type into a logical address indicating data in block units when the destination address is a host physical address indicating data in units smaller than a block unit, wherein the storage controller further comprises a flash translation layer configured to convert the logical address into a physical address of a second type indi-cating a storage area of the non-volatile memory, and wherein the non-volatile memory is configured to store the first data stored in the buffer memory in a storage area indicated by the physical address of the second type.

5. The storage device of claim 1, wherein the storage controller further comprises a request scheduler configured to schedule requests received from the plurality of external hosts and a third request received from the external storage device.

6. The storage device of claim 5, wherein the request scheduler is further configured to:

schedule a first number of requests from among the requests to be processed prior to the third request when cache update information included in the third request indicates invalidation of the cache area;

schedule a second number of requests from among the requests, wherein the second number is less than the first number, to be processed prior to the third request when the cache update information included in the third request indicates to update some of the data to the cache area; and schedule a third number of requests from among the requests, wherein the third number is less than the second number, to be processed prior to the third request when the cache update information included in the third request indicates to update all of the data to the cache area.

7. The storage device of claim 5, wherein the request scheduler is further configured to perform a scheduling operation based on the cache update information included in the third request, internal operation information of the non-volatile memory, and cache contention information on the cache memory.

8. The storage device of claim 1, wherein the interface circuit is further configured to, upon receiving the response to the second request from the external storage device, provide a response corresponding to the first request to the first external host.

9. An operating method of a storage device that includes a non-volatile memory and a storage controller and is connected to an external storage device through a switch, the operating method comprising:

receiving, from an external host, a first request including a source address indicating a storage area of the non-volatile memory, a destination address indicating a storage area of the external storage device, and cache update information indicating an update method of a cache memory;

generating a physical address of a first type indicating a cache area of the cache memory based on the source address;

generating a physical address of a second type indicating the storage area of the non-volatile memory based on the source address;

acquiring data based on the physical address of the first type and the physical address of the second type;

updating a cache area indicated by the physical address of the first type based on the cache update information;

providing a second request including the destination address and the data to the external storage device; and receiving a response corresponding to the second request from the external storage device.

10. The operating method of claim 9, wherein the updat-ing of the cache area comprises performing one of updating some of the data to the cache area, updating all of the data to the cache area, or invalidating the cache area.

11. The operating method of claim 9, wherein the acquir-ing of the data based on the physical address of the first type and the physical address of the second type comprises:

reading some of the data from a storage area of the cache memory indicated by the physical address of the first type; and reading a remainder of the data from a storage area of the non-volatile memory indicated by the physical address of the second type.

12. The operating method of claim 9, wherein, when the source address is a host physical address indicating data in units smaller than block units, the generating of the physical address of the first type comprises converting the host physical address into the physical address of the first type, and the generating of the physical address of the second type comprises:

converting the physical address of the first type into a logical address in block units; and converting the logical address into the physical address of the second type.

13. The operating method of claim 9, further comprising, based on the cache update information, scheduling requests received from a plurality of external hosts including the external host and a third request received from the external storage device.

14. The operating method of claim 13, wherein the scheduling of the requests and the third request comprises:

when cache update information included in the third request indicates to invalidate the cache area, scheduling a first number of requests from among the requests to be processed prior to the third request;

when the cache update information included in the third request indicates to update some of the data to the cache area, scheduling a second number of requests from among the requests, wherein the second number is less than the first number, to be processed prior to the third request; and when the cache update information included in the third request indicates to update all of the data to the cache area, scheduling a third number of requests from among the requests, wherein the third number is less than the second number, to be processed prior to the third request.

15. An operating method of a storage device that includes a non-volatile memory and a storage controller and is connected to an external storage device through a switch, the operating method comprising:

receiving, from an external host, a first request including a source address indicating one of a storage area of the external storage device or a storage area of the non-volatile memory, a destination address indicating a remaining one of the storage area of the external storage device or the storage area of the non-volatile memory, and cache update information indicating an update method of a cache memory;

providing a second request including one of the source address or the destination address to the external storage device;

generating a physical address of a first type indicating a cache area of the cache memory based on a remaining one of the source address or the destination address;

updating a cache area indicated by the physical address of the first type based on the cache update information; and receiving a response corresponding to the second request from the external storage device.

16. The operating method of claim 15, wherein the updating of the cache area comprises performing one of updating, to the cache area, some of data corresponding to the remaining one of the source address or the destination address, updating all of the data to the cache area, or invalidating the cache area.

17. The operating method of claim 15, further comprising, based on the cache update information, scheduling requests received from a plurality of external hosts including the external host and a third request received from the external storage device.

18. The operating method of claim 17, wherein the scheduling of the requests and the third request comprises:

when cache update information included in the third request indicates invalidating the cache area, scheduling a first number of requests from among the requests to be processed prior to the third request;

when the cache update information included in the third request indicates updating, to the cache area, some of data corresponding to the remaining one of the source address or the destination address, scheduling a second number of requests from among the requests, wherein the second number is less than the first number, to be processed prior to the third request; and when the cache update information included in the third request indicates updating all of the data to the cache area, scheduling a third number of requests from among the requests, wherein the third number is less than the second number, to be processed prior to the third request.

19. The operating method of claim 15, wherein the providing of the second request comprises providing the second request including the source address to the external storage device, wherein the receiving of the response comprises receiving the response including data corresponding to the source address, wherein the destination address indicates the storage area of the non-volatile memory, and wherein the method further comprises storing the data in the storage area of the non-volatile memory indicated by the destination address.

20. The operating method of claim 15, wherein the source address indicates the storage area of the non-volatile memory, wherein the method further comprises reading data from the storage area of the non-volatile memory indicated by the source address, and wherein the providing of the second request comprises providing the second request including the data and the destination address to the external storage device.

* * * * *